United States Patent
Leino

(10) Patent No.: US 6,540,878 B1
(45) Date of Patent: Apr. 1, 2003

(54) STABILIZED FILLER, ITS PRODUCTION AND USE

(75) Inventor: Hannu Juhani Leino, Kalastajankuja (FI)

(73) Assignee: AGA Aktiebolag, Lidingo (SE)

(*) Notice: Subject to any disclaimer, the term of this patent is extended or adjusted under 35 U.S.C. 154(b) by 0 days.

(21) Appl. No.: 09/673,011

(22) PCT Filed: Jan. 26, 2000

(86) PCT No.: PCT/FI00/00053

§ 371 (c)(1),
(2), (4) Date: Dec. 18, 2000

(87) PCT Pub. No.: WO00/47817

PCT Pub. Date: Aug. 17, 2000

(30) Foreign Application Priority Data

Feb. 8, 1999 (FI) .................................................. 990230

(51) Int. Cl.$^7$ ........................... D21H 17/69; C01F 11/18
(52) U.S. Cl. .................... 162/181.2; 162/185; 106/464; 423/430
(58) Field of Search ........................... 162/4, 8, 12, 63, 162/158, 181.1, 182, 183, 185, 189, 190, 191; 423/DIG. 3, 189, 437.1, 438, 430; 516/77, 78; 106/463, 464, 465

(56) References Cited

U.S. PATENT DOCUMENTS

| | | | | |
|---|---|---|---|---|
| 1,993,265 A | * | 3/1935 | Dyer .......................... | 162/180 |
| 5,043,017 A | | 8/1991 | Passaretti | |
| 5,156,719 A | | 10/1992 | Passaretti | |
| 5,262,006 A | | 11/1993 | Andersson et al. | |
| 5,378,322 A | * | 1/1995 | Hornsey ...................... | 162/158 |
| 6,228,161 B1 | * | 5/2001 | Drummond .................. | 106/464 |

FOREIGN PATENT DOCUMENTS

| | | |
|---|---|---|
| EP | 0 281 273 | 9/1988 |
| GB | 2 008 562 | 6/1979 |

OTHER PUBLICATIONS

WO 96/26901, Production of Precipitated Calcium Carbonate, Sep. 6, 1996.
WO 99/35333, Improved Papermaking Processes, Jul. 15, 1999.
WO 99/45202, Improved Papermaking Processes, Sep. 10, 1999.
WO 98/29601, The Use of Calcium Carbonate in an Acidic Aqueous Media, Jul. 9, 1998.
Eklund D. and Lindstrom T., Paper Chemistry: An Introduction, 1991, pp. 251–255.

* cited by examiner

*Primary Examiner*—Steven P. Griffin
*Assistant Examiner*—Eric Hug
(74) *Attorney, Agent, or Firm*—Pearne & Gordon LLP

(57) ABSTRACT

The present invention relates to a stabilized calcium carbonate filler, a process for stabilizing calcium carbonate, the use of the stabilized filler in a paper making system, and an improved paper making process wherein calcium carbonate is used as a filler. Specifically, the invention relates to a process wherein the rate of dissolution of calcium carbonate filler is retarded as compared to the rate found in conventional paper making processes. The rate of dissolution is retarded by addition of carbon dioxide to a slurry containing the calcium carbonate filler.

28 Claims, No Drawings

STABILIZED FILLER, ITS PRODUCTION AND USE

The present invention relates to a stabilized calcium carbonate filler, a process for stabilizing calcium carbonate, its use in a paper making system and to an improved paper making process wherein stabilized calcium carbonate is used as a filler. Specifically the invention relates to a process wherein the dissolution of calcium carbonate filler is retarded compared to conventional paper making processes.

Calcium carbonate $CaCO_3$ is commonly used in paper making as a filler or pigment because it has a high brightness and it is the whitest filler in the price range in question. There are many products under the name calcium carbonate with the same chemical composition but with different physical properties. The products fall into two general classifications:

the natural products made directly by physically grinding chalk, limestone and marble, and the precipitated products manufactured by chemically reacting various raw materials.

Precipitated calcium carbonate, PCC, can be produced as a filler to a host paper mill through a so called on-site plant concept. A small plant is built within the confines of the paper mill to manufacture PCC. Carbon dioxide containing gas such as smoke as is introduced into a slurry of slaked lime. At a pH above about 10.3 calcium carbonate is precipitated. The resulting PCC is then sent via pipeline directly to the paper mill at typically 20% solids. Due to the short run and the low solids viscosity of the PCC slurry, no dispersant is necessary as with natural products. Therefore, the system has proven to be advantageous for better wet-end paper machine chemistry. Another benefit of this system is that, since each on-site plant is associated with a particular mill, customized PCC fillers can be made for a mill's needs.

PCC is manufactured with high chemical purity which provides a consistent "clean" particle surface. This surface characteristic along with uniform particle size and unique morphologies are felt to be the predominate reasons for the substantial difference observed in the paper filling performance between PCC and natural products. PCC fillers tend to provide higher opacity and bulk, while natural products are less determined on sheet strength and internal sizing.

Calcium carbonate, irrespective of whether it is of natural origin or precipitated, is partially soluble in water e.g. according to the following equations:

$$CaCO_3 <-> Ca^{2+} + CO_3^{2-}$$

$$CO_3^{2-} + H_2O <-> HCO_3^- + OH^-$$

$$HCO_3^- + H_2O <-> H_2CO_3 + OH^-$$

$$H_2CO_3 <-> CO_2 + H_2O$$

Calcium carbonate is fairly stable in alkaline conditions above a pH of about 7.5, but it is attacked by acids such as sulfuric acid and alum, as a result of which carbon dioxide is released. Therefore, it is well known to those skilled in the art that calcium carbonate is not generally a suitable filler for paper making at an acidic pH.

In attempts to improve the use of calcium carbonate at lower pH ranges so called acid tolerant PCC products have been developed, as exemplified by U.S. Pat. No. 5,043,017, wherein a slurry of calcium carbonate (PCC) is mixed with a calcium chelating agent or a conjugate base such as sodium hexametaphosphate and a weak acid such as phosphoric acid to provide an acid stabilized PCC. In the laboratory tests described in said US Patent it seems that the PCC slurry had been treated with carbon dioxide to obtain a stable initial pH of 8.0.

There are a number of draw-backs associated with the use of acid-tolerant PCC, such as environmental problems with the phosphorous compounds used in the process. The use of acid-tolerant PCC also requires technically complicated handling of chemicals which are foreign to the paper making processes.

Consequently, there exists a need to improve the use of calcium carbonate as a filler in paper making processes.

The present invention is based on the realization that carbon dioxide may be used to stabilize the calcium carbonate prior to its entering the paper making process.

Carbon dioxide is a gas, which dissolves in water forming carbonic acid and bicarbonate ions according to the reaction:

$$CO_2 + H_2O <-> H_2CO_3 <-> H^+ + HCO_3^-$$

Carbon dioxide or smoke gas containing carbon dioxide is used to produce precipitated calcium carbonate, PCC. Carbon dioxide has also been used (as mentioned e.g, in U.S. Pat. No. 5,043,017) for lowering the pH of PCC slurries to 8.0 prior to the acid stabilization treatment.

According to U.S. Pat. No. 5,262,006 precipitation of gypsum in an alkaline recycle or broke derived pulp may be prevented by adding carbon dioxide to form bicarbonate ions in the alkaline pulp and to precipitate calcium as carbonate.

According to EP Patent 0 281 273 carbon dioxide may be used for adjusting the pH of alkaline pulps upstream of the fibrilation step.

It is well known in the art that the solubility of calcium carbonate increases with decreasing pH. According to GB Patent Application 2 008 562 carbon dioxide may be used for increasing the solubility of calcium carbonate and for the hardening of recycled waters used in the treatment of pulp from waste paper.

It is also known that increasing the carbon dioxide partial pressure increases the solubility of calcium carbonate (D. Eklund, T. Lindstrom, Paper Chemistry—an introduction, DT Paper Science Publications, Grankulla, Finland 1991, p. 253). Consequently, the prior art paper making processes have recommended the use of calcium carbonate as a filler for alkaline but not for acidic pulps.

It has now surprisingly been found that carbon dioxide may be used to improve the function of calcium carbonate as a filler in paper making processes operating at pH below 8.0 and preferably a pH range of 6.5 to 7.5, more preferably at 7.0 to 7.2.

Contrary to common belief, it has been found that calcium carbonate can be used as a filler also in slightly acidic and neutral pulps provided that carbon dioxide is used to protect the calcium carbonate from dissolving by the acid attack.

The invention according to the present application is defined in the appended claims, the contents of which are included herein by reference.

Consequently, the present invention relates to a stabilized calcium carbonate filler for use in a paper making system. The filler comprises finely divided ground natural calcium carbonate or precipitated calcium carbonate in an aqueous slurry to which has been added an amount of carbon dioxide sufficient to lower the pH of the slurry below 8.0 and preferably to a pH below 7.5 thereby retarding the dissolution of said calcium carbonate in said paper making system.

The present invention also relates to a process for producing a stabilized calcium carbonate filler for use in a paper making system, wherein an aqueous slurry of finely divided ground natural calcium carbonate or precipitated calcium carbonate is treated with an amount of carbon dioxide sufficient to lower the pH of the slurry below 8.0 and preferably to a pH below 7.5 for retarding the dissolution of said calcium carbonate in said paper making system.

The invention further relates to a process for producing paper using stabilized calcium carbonate as a filler, comprising providing a pulp suspension in a paper making system; providing an aqueous slurry containing finely divided ground natural calcium carbonate or precipitated calcium carbonate; adding to said aqueous calcium carbonate slurry an amount of carbon dioxide sufficient to lower the pH of said slurry below 8.0 and preferably to a pH below 7.5; immediately after said addition, feeding said carbon dioxide containing calcium carbonate slurry to said pulp suspension; feeding said calcium carbonate containing pulp suspension to a web forming device of a paper machine, and processing said web into paper or board having a major portion of said calcium carbonate as a solid filler.

For an optimum effect to be achieved, the carbon dioxide should be introduced into the slurry just prior to its being fed into the paper making system. In order to achieve the desired pH level it may be necessary to provide for an increased pressure in the slurry, as appreciated by those skilled in the art.

The advantages of the present invention are most significant in cases wherein the pH of the resulting calcium carbonate containing pulp suspension is maintained at a pH below 8.0, since at such conditions normal calcium carbonate would be quickly dissolved. However, it is fully possible to utilized the dissolution retarded calcium carbonate of the present invention also with processes having a higher pH.

The invention also relates to the use of carbon dioxide for retarding the dissolution of calcium carbonate in a paper making system, according to which carbon dioxide is introduced into an aqueous slurry of finely divided ground natural calcium carbonate or precipitated calcium carbonate just prior to said slurry being fed into a pulp suspension of said paper making system, said carbon dioxide being introduced in an amount sufficient to lower the pH of the slurry below 8.0 and preferably to a pH below 7.5.

According to the preferred embodiments of the invention, carbon dioxide is introduced into the calcium carbonate slurry in an amount to provide a pH of about 6.5 to 7.5, especially 7.0 to 7.2.

The calcium carbonate is preferably PCC the dissolution rate of which will be retarded in the aqueous pulp due to the carbon dioxide treatment.

Special benefits are obtained by the use of the present stabilizing procedure since it makes it possible to use calcium carbonate as a filler for wood containing papers which traditionally cannot be produced with ground calcium carbonate or PCC because of the acid pH conditions attacking the calcium carbonate.

The preferred paper making system of the present invention is a wood containing pulp and the pH of the pulp suspension is maintained at a value below 7.5, preferably 7.0 to 7.5. According to a preferred embodiment the paper produced is a wood containing paper such as LWC (light weight coated) or SC (supercalendered) papers or newsprint. However, the present invention is applicable also to other types of paper making systems wherein the calcium carbonate is likely to come into contact with conditions which would normally cause dissolution of calcium carbonate. Thus, it may be advantageous to use the present invention in the production of fine papers which are traditionally run at an alkaline pH but which may be run at a lower pH with use of the present invention. The dissolution retarded calcium carbonate of the present invention may of course also be used under conditions where the pH is above 8.0, if desired.

In a preferred embodiment of the present invention carbon dioxide is used also for adjusting the pH of the pulp suspension or stock in the paper making system. The carbon dioxide may be used for adjusting the pH of the pulp both prior to and after the addition of the stabilized calcium carbonate slurry, as desired. If large amounts of strong acids such as sulfuric acid are added to the pulp, this might cause quick dissolution of the calcium carbonate after it has been mixed into the pulp.

Although not wishing to be bound by any theory, it is believed that the calcium carbonate slurry of the present invention is stabilized by carbon dioxide because it has an excess of carbonate ions retarding the dissociation of calcium carbonate into calcium ions and carbonate ions. The carbon dioxide should preferably be introduced into the calcium carbonate slurry at a very late stage before addition to the pulp suspension. An introduction point should preferably be selected so as to be at the closest technically feasible point in the process prior to adding the slurry to the pulp. A pipe leading from a slurry tank to the paper making system is a preferred introduction point. Carbon dioxide may be added at a pressure so as to achieve the desired pH level.

The present introduction of carbon dioxide to the calcium carbonate slurry just prior to introduction into the pulp should not be confused with the prior art procedures of adding carbon dioxide to a slurry of slaked lime in order to precipitate the calcium carbonate to form PCC nor should it be confused with the subsequent additions of carbon dioxide to such a PCC slurry in order to "kill off" any remaining CaOH. These prior art procedures have generally been performed well ahead of the feeding of the calcium carbonate slurry into the paper making system and the aim has not been to retard the dissolution of the calcium carbonate in the pulp, but rather to lower the pH from the very high alkaline values of the precipitation process and/or to protect the paper making system from instable alkaline additions.

In the preferred paper making process of the present invention, the carbon dioxide treated calcium carbonate should be fed immediately after the treatment to the pulp suspension. The carbon dioxide treatment of the present invention is clearly distinguished from any prior art processes of lowering the pH of PCC slurries from their initial high pH of about 10. It is also distinguished from prior art processes of stabilizing the pH of PCC slurries produced on site or delivered to the mills at varying pH levels.

In contrast to the prior art processes, the calcium carbonate slurry of the present invention is treated with carbon dioxide to provide a pH which is lower than that normally attained for such slurries. The treatment is performed in order to prevent the subsequent contact with the pulp from dissolving the calcium carbonate or at any rate in order to significantly retard said dissolution. Hence the carbon dioxide treatment should preferably be done just prior to the mixing of the slurry with said pulp to provide a short retention time of carbon dioxide in contact with the calcium carbonate.

However, if needed e.g. for technical reasons, the carbon dioxide may also be introduced at an earlier location causing a fairly long retention time of carbon dioxide in the calcium carbonate slurry. In such cases care should be taken that the conditions are such that the carbon dioxide is not allowed to escape into the air.

The dissolution retarded calcium carbonate according to the present invention should preferably be devoid of any significant amounts of other dissolution retarding agents than carbon dioxide.

A specific advantage of the present invention resides in that the carbon dioxide used according to the present invention may serve the dual purpose of retarding calcium carbonate dissolution and of lowering the pH of the paper making system. The use of carbon dioxide is also environmentally advantageous in comparison to the use of other means of stabilizing calcium carbonate.

The carbon dioxide is preferably used in gaseous form, although it may be added as an aqueous liquid by dissolving gaseous or liquid carbon dioxide in water. The carbon dioxide may be combined with a fluid prior to feeding to the slurry although it is preferred to feed it directly into the calcium carbonate slurry flowing in a pipe leading into the pulp suspension.

The carbon dioxide gas to be used in the present processes may be generated on site or may be bought as desired. Feeding of carbon dioxide into the slurry is technically clean and easy.

The production of paper or board according to the present invention is performed in a conventional way in all other respects except as specifically described above. Such paper making processes are well known in the art and it is not considered necessary to describe them here in any greater detail.

The invention will now be illustrated with a few examples which should not be considered as limiting the invention in any way.

REFERENCE EXAMPLE 1

A paper mill has one paper machine producing supercalendered (SC) paper. The raw material is made up of 70% TMP (thermo mechanical pulp) and 30% bleached kraft pulp The pH of the stock entering the short circulation is 5.8–6.3. The machine is run with a pH in the head box of 6.0–6.5. The pH in the short circulation is controlled with an addition of $H_2SO_4$ in the wire pit. Because of the acidic conditions, the mill uses kaolin clay as a filler and the process runs smoothly.

REFERENCE EXAMPLE 2

The process of Reference Example 1 is repeated with using $CaCO_3$ instead of kaolin as a filler. The $CaCO_3$ is delivered in the form of a PCC slurry to the mill.

In order not to dissolve the filler, the pH of the stock entering the short circulation is adjusted to pH 7.8. The process runs fairly smoothly at a pH of 7.8±0.2 in the head box without acid additions. However, the produced paper is yellowish and lacks brightness due to the effect of the high pH on the mechanical pulp.

REFERENCE EXAMPLE 3

The process of Reference Example 2 is repeated with PCC as a filler but at a lower pH.

The pH of the stock entering the short circulation is adjusted to 6.8 to 7.0 and $H_2SO_4$ is added to the wire pit. Very soon after the PCC addition is started, heavy foaming occurs in the white water tank due to carbon dioxide gas formation. Calcium precipitates form in various positions of the equipment.

As a consequence, the $H_2SO_4$ addition is reduced. This reduces the foaming but does not prevent it totally. Calcium precipitates still disturb the process. During the trial the pH in the head box varies considerably with a variation of 6,8+/−0,6, which affects the runnability of the paper machine and causes several web brakes.

WORKING EXAMPLE 1

In a mill-scale trial of 15 hours the process of the Reference Examples is repeated with using the $CO_2$ treated PCC of the present invention. The pH of the PCC is adjusted to 7.0 by feeding carbon dioxide into the pipe between the PCC storage tank and the paper machine.

The pH of the stock entering the short circulation is adjusted with $H_2SO_4$ to 6.9 to 7.1. The dissolution retarded PCC is added to the stock and no significant foaming is observed. The calcium dissolution is reduced and the disturbing effect of calcium precipitates is diminished considerably. The process runs smoothly at the head box with a pH of 7.1±0.2. The paper produced has an acceptable brightness.

WORKING EXAMPLE 2

The trial of Working Example 2 is repeated with the exception that the pH adjustment is performed with $CO_2$ instead of $H_2SO_4$. The dissolution retarded PCC is added without any foaming and there is no disturbance in the process from calcium precipitates.

The paper machine runs smoothly. The pH at the head box is maintained at a steady level of 7.1±0.1 and the paper produced has a good brightness.

It is evident to those skilled in the art that the invention may be varied in a great number of ways which are obvious to those skilled in the art without deviating from the scope of the claims.

I claim:

1. A stabilized calcium carbonate filler for use in a paper making system, comprising finely divided ground natural calcium carbonate or precipitated calcium carbonate in an aqueous slurry wherein said calcium carbonate is stabilized against dissolution by an excess of carbonate ions provided by an amount of carbon dioxide sufficient to lower the pH of the slurry below 8.0 thereby retarding the dissolution of said calcium carbonate in said paper making system.

2. The stabilized calcium carbonate filler of claim 1 wherein said slurry is devoid of any significant amounts of other dissolution retarding agents than carbon dioxide.

3. The filler according to claim 1, wherein said paper is a wood containing paper selected from the group consisting of LWC paper, SC paper and newsprint.

4. A filler according to claim 1, wherein the amount of carbon dioxide introduced into said slurry is sufficient to lower the pH of the slurry to a pH below 7.5.

5. A process for producing a stabilized calcium carbonate filler for use in a paper making system, wherein an aqueous slurry of finely divided ground natural calcium carbonate or precipitated calcium carbonate is stabilized against calcium carbonate dissociation by providing in the slurry an excess of carbonate ions through introduction of an amount of carbon dioxide sufficient to lower the pH of the slurry below 8.0 for retarding the dissolution of said calcium carbonate in said paper making system.

6. The process according to claim 5 wherein no significant amounts of other dis-solution retarding agents than carbon dioxide are added to said slurry.

7. A process according to claim 5, wherein said aqueous slurry is treated with an amount of carbon dioxide sufficient to lower the pH of the slurry below 7.5.

8. A process for producing paper using stabilized calcium carbonate as a filler, characterized in providing a pulp suspension in a paper making system;

providing an aqueous slurry containing finely divided ground natural calcium carbonate or precipitated calcium carbonate;

stabilizing said slurry against calcium carbonate dissociation by an excess of carbonate ions provided by introducing into said slurry an amount of carbon dioxide sufficient to lower the pH of said slurry below 8.0;

after said introducing, feeding said carbon dioxide containing calcium carbonate slurry to said pulp suspension;

feeding said calcium carbonate containing pulp suspension to a web forming device of a paper machine, and processing said web into paper or board having a major portion of said calcium carbonate as a solid filler.

9. The process according to claim 8, wherein said carbon dioxide is introduced into said slurry just prior to its being fed into said paper making system.

10. The process according to claim 9, wherein said carbon dioxide is introduced in an amount sufficient to lower the pH of said slurry to a pH of 6.5 to 7.5.

11. The process according to claim 8, wherein carbon dioxide is used also to adjust the pH of the pulp suspension prior to and/or after the feeding of said slurry into said pulp suspension.

12. The process according to claim 8, wherein the pH of said calcium carbonate containing pulp suspension is maintained at a pH below 8.0 throughout the process.

13. The process according to any one of claims 8 to 12, wherein said pulp suspension is a wood containing pulp and the pH of the pulp suspension is maintained at a value below 7.5.

14. A process according to claim 8, wherein in the amount of carbon dioxide introduced into said aqueous calcium carbonate slurry is sufficient to lower the pH of said slurry below 7.5.

15. A process according to claim 13, wherein the pH of the pulp suspension is maintained at a value between 7.0 and 7.5.

16. A process according to claim 11, wherein the carbon dioxide used to adjust the pH of the pulp suspension is used prior to the feeding of said slurry into said pulp suspension.

17. A process according to claim 11, wherein the carbon dioxide used to adjust the pH of the pulp suspension is used after the feeding sad slurry into said pulp suspension.

18. Process for retarding the dissolution of calcium carbonate in a paper making system comprising stabilizing an aqueous slurry of finely divided ground natural calcium carbonate or precipitated calcium carbonate against calcium carbonate dissociation by an excess of carbonate ions provided by introducing carbon dioxide into said aqueous slurry just prior to said slurry being fed into a pulp suspension of said paper making system, said carbon dioxide being introduced in an amount sufficient to lower the pH of the slurry below 8.0.

19. A process according to claim 18, wherein said carbon dioxide is introduced in an amount sufficient to lower the pH of the slurry below 7.5.

20. A stabilized calcium carbonate filler for use in a paper making system, comprising finely divided ground natural calcium carbonate or precipitated calcium carbonate in an aqueous slurry wherein said calcium carbonate is stabilized against dissociation by an excess of carbonate ions provided by an amount of carbon dioxide sufficient to lower the pH of said slurry to pH 7–8, thereby retarding the dissolution of said calcium carbonate when introduced into a paper making system operating at a pH of 7 or higher.

21. The stabilized calcium carbonate filler of claim 20 wherein the pH of said slurry is between 7.0 and 7.2.

22. A process for producing a stabilized calcium carbonate filler for use in a paper making system, wherein an aqueous slurry of finely divided ground natural calcium carbonate or precipitated calcium carbonate is stabilized against calcium carbonate dissociation by providing in the slurry an excess of carbonate ions through introduction of an amount of carbon dioxide sufficient to lower the pH of the slurry to pH 7–8, thereby retarding the dissolution of said calcium carbonate when introduced into a paper making system operating at a pH of 7 or higher.

23. The process of claim 22 wherein the pH of said slurry is lowered to between 7.0 and 7.2.

24. A process for producing paper using stabilized calcium carbonate as a filler, said process comprising the steps of providing a pulp suspension in a paper making system;

providing an aqueous slurry containing finely divided ground natural calcium carbonate or precipitated calcium carbonate;

stabilizing said slurry against calcium carbonate dissociation by an excess of carbonate ions provided by introducing into said slurry an amount of carbon dioxide sufficient to lower the pH of said slurry to pH 7–8;

immediately after said introducing, feeding said carbon dioxide containing calcium carbonate slurry to said pulp suspension, the pH of which has been adjusted to pH 7 or higher;

feeding said calcium carbonate containing pulp suspension to a web forming device of a paper machine, and processing said web into paper or board having a said calcium carbonate as a solid filler.

25. The process according to claim 5 or 24, wherein said carbon dioxide is introduced into said slurry in a pipe for feeding said slurry to said pulp suspension.

26. The process of claim 25 wherein the pH of said slurry is lowered to between 7.0 and 7.2.

27. The process of claim 24 wherein the pH of said pulp suspension is adjusted with carbon dioxide.

28. A process for retarding the dissolution of calcium carbonate in a paper making system comprising stabilizing an aqueous slurry of finely divided ground natural calcium carbonate or precipitated calcium carbonate against calcium carbonate dissociation by an excess of carbonate ions provided by introducing carbon dioxide into said aqueous slurry just prior to said slurry being fed into a pulp suspension of said paper making system, said pulp suspension having a pH of 7 or higher and said carbon dioxide being introduced in an amount sufficient to lower the pH of said slurry to pH 7–8.

* * * * *

UNITED STATES PATENT AND TRADEMARK OFFICE
CERTIFICATE OF CORRECTION

PATENT NO. : 6,540,878 B1
DATED : April 1, 2003
INVENTOR(S) : Hannu Juhani Leino It is certified that error appears in the above-identified patent and that said Letters Patent is hereby corrected as shown below:

<u>Title page,</u>
Item [56], FOREIGN PATENT DOCUMENTS, please insert the following:
-- WO    99/61374    12/1999
   WO    99/61703    12/1999
   WO    00/39222    7/2000 --.

<u>Column 7,</u>
Line 34, delete "in".
Line 46, delete "sad" and insert -- said --.

Signed and Sealed this

Twenty-fifth Day of November, 2003

JAMES E. ROGAN
*Director of the United States Patent and Trademark Office*